US008893233B2

(12) United States Patent
Lee et al.

(10) Patent No.: US 8,893,233 B2
(45) Date of Patent: Nov. 18, 2014

(54) REFERER VERIFICATION APPARATUS AND METHOD

(75) Inventors: Chul-Woo Lee, Daejeon (KR);
Deok-Jin Kim, Daejeon (KR);
Byoung-Jin Han, Suwon-si (KR);
Byung-Chul Bae, Daejeon (KR);
Sang-Woo Park, Daejeon (KR);
Man-Hee Lee, Daejeon (KR); E-Joong Yoon, Daejeon (KR)

(73) Assignee: Electronics and Telecommunications Research, Daejeon (KR)

( * ) Notice: Subject to any disclaimer, the term of this patent is extended or adjusted under 35 U.S.C. 154(b) by 114 days.

(21) Appl. No.: 13/609,126

(22) Filed: Sep. 10, 2012

(65) Prior Publication Data

US 2013/0347069 A1   Dec. 26, 2013

(30) Foreign Application Priority Data

Jun. 25, 2012   (KR) .......................... 10-2012-0067734

(51) Int. Cl.
*G06F 7/04*   (2006.01)

(52) U.S. Cl.
USPC ........ 726/3; 726/12; 726/22; 726/23; 726/24; 726/25; 713/154; 713/156; 715/222; 715/224

(58) Field of Classification Search
CPC .................. G06F 2221/2119; G06F 11/3419; G06F 11/3438; G06F 13/00; G06F 21/51; G06F 21/6209; G06F 21/64; G06F 21/73; G06F 2201/86; G06F 2201/87; G06F 2201/875; G06F 2201/88; G06F 2221/074
USPC .................... 726/3, 12, 22–25; 713/154, 156; 715/222, 224
See application file for complete search history.

(56) References Cited

U.S. PATENT DOCUMENTS

| 8,286,248 | B1 * | 10/2012 | Oliphant et al. | 726/25 |
|---|---|---|---|---|
| 8,316,429 | B2 * | 11/2012 | Long et al. | 726/12 |
| 8,555,269 | B2 * | 10/2013 | Huang et al. | 717/154 |
| 8,572,737 | B2 * | 10/2013 | Holloway et al. | 726/23 |
| 2008/0320567 | A1 | 12/2008 | Shulman et al. | |
| 2011/0099620 | A1 | 4/2011 | Stavrou et al. | |

FOREIGN PATENT DOCUMENTS

| KR | 10-2012-0000812 A | 1/2012 |
|---|---|---|
| KR | 10-1132573 B1 | 4/2012 |

OTHER PUBLICATIONS

Brian Schulte et al., "NetGator: Malware Detection Through Program Interactive Proofs," Technical Report GMU-CS-TR, 2011.
Thomas Bläsing et al., "An Android Application Sandbox System for Suspicious Software Detection," 5th International Conference on Malicious and Unwanted Software, 2010.

* cited by examiner

*Primary Examiner* — Thanhnga B Truong
(74) *Attorney, Agent, or Firm* — LRK Patent Law Firm

(57) ABSTRACT

A referer verification apparatus and method for controlling web traffic having malicious code are provided. In the referer verification method, whether a referer is present in a Hypertext Transfer Protocol (HTTP) packet is determined. If it is determined that the referer is present in the HTTP packet, Uniform Resource Locators (URLs) are extracted from a referer web page corresponding to the referer. The referer is verified based on a URL corresponding to a referer verification request received from a server and the extracted URLs. A Completely Automated Public Test to tell Computers and Humans Apart (CAPTCHA) verification procedure conducted by a user is performed based on results of the verification of the referer.

8 Claims, 3 Drawing Sheets

REFERER VERIFICATION APPARATUS AND METHOD

CROSS REFERENCE TO RELATED APPLICATION

This application claims the benefit of Korean Patent Application No. 10-2012-0067734, filed on Jun. 25, 2012, which is hereby incorporated by reference in its entirety into this application.

BACKGROUND OF THE INVENTION

1. Technical Field

The present invention relates generally to a referer verification apparatus and method. More particularly, the present invention relates to a referer verification apparatus and method which control web traffic having malicious code.

2. Description of the Related Art

Technology for detecting malicious code is based on a host or a network, or is present in a hybrid form. Also, anti-virus products are mainly used to detect malicious code in a Personal Computer (PC).

Technology for detecting malicious code based on a host has a larger amount of information that can be observed than does technology based on a network, so that malicious code can be more precisely detected. However, this technology is disadvantageous in that performance is deteriorated because internal PC resources are consumed. Further, since current anti-virus products are mainly operated based on signatures, there is a disadvantage in that a lot of time may be required to detect or block code suspected of being malicious.

Along with the above disadvantages, in consideration of the fact that recent malicious code abides by normal behavior similar to that of a normal application in the PC and performs network communication operation, technologies for detecting malicious code based on a network have been proposed.

For example, a paper "NetGator: Malware Detection Through Program Interactive Proofs" is intended to detect malicious code (malware) by distinguishing web browser software, which uses Hypertext Transfer Protocol (HTTP)/Hypertext Transfer Protocol over Secure Sockets Layer (HT-TPS), from malware using a technique called authentication code execution verification. This technology then blocks malicious code traffic by means of such detection, but is problematic in that other normal applications are not verified.

Further, U.S. patent application Ser. No. 757,675 (Malware Detector) improves the convenience of a user by authenticating applications, but it is problematic in that all HTTP traffic is not necessarily authenticated regardless of the protocol used by an application.

SUMMARY OF THE INVENTION

Accordingly, the present invention has been made keeping in mind the above problems occurring in the prior art, and an object of the present invention is to provide a referer verification apparatus and method which control web traffic having malicious code.

In accordance with an aspect of the present invention to accomplish the above object, there is provided a referer verification method including determining whether a referer is present in a Hypertext Transfer Protocol (HTTP) packet; if it is determined that the referer is present in the HTTP packet, extracting Uniform Resource Locators (URLs) from a referer web page corresponding to the referer; verifying the referer based on a URL corresponding to a referer verification request received from a server and the extracted URLs; and performing a Completely Automated Public Test to tell Computers and Humans Apart (CAPTCHA) verification procedure conducted by a user based on results of the verification of the referer.

Preferably, the referer verification method may further include, before verifying the referer, parsing the HTTP packet and determining based on results of the parsing whether a cache is present; and determining whether to perform the verifying the referer depending on results of determining whether the cache is present.

Preferably, the extracting the URLs may include identifying URLs statically described in the referer web page and then extracting static URLs.

Preferably, the extracting the URLs may include identifying URLs generated by a plurality of pieces of code executed on the referer web page and then extracting dynamic URLs.

Preferably, the performing the CAPTCHA verification procedure may correspond to a procedure of verifying malicious code traffic using a cognitive response of the user.

In accordance with another aspect of the present invention to accomplish the above object, there is provided a referer verification apparatus including a server communication unit for receiving a referer verification request from a server and transferring results of the verification corresponding to the received request to the server; a Uniform Resource Locator (URL) extraction unit for, if a referer is present in a Hypertext Transfer Protocol (HTTP) packet corresponding to the referer verification request, extracting URLs from a reefer web page corresponding to the referer; a referer verification unit for verifying the referer based on a URL corresponding to the referer verification request and the extracted URLs; and a Completely Automated Public Test to tell Computers and Humans Apart (CAPTCHA) request management unit for performing a CAPTCHA verification procedure conducted by a user based on results of the verification of the referer.

Preferably, the referer verification apparatus may further include a preprocessing unit for parsing the HTTP packet, determining based on results of the parsing whether a cache is present, and determining based on results of the determination whether to verify the referer.

Preferably, the URL extraction unit may identify URLs statically described in the referer web page and then extracts static URLs.

Preferably, the URL extraction unit may identify URLs generated by a plurality of pieces of code executed on the referer web page and then extracts dynamic URLs.

Preferably, the CAPTCHA verification procedure may correspond to a procedure of verifying malicious code traffic using a cognitive response of the user.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
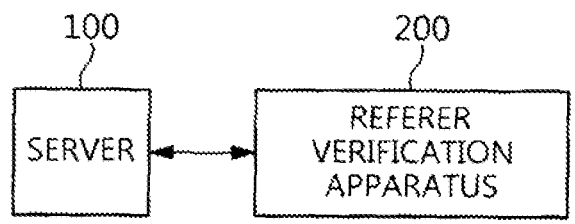
FIG. 1 is a configuration diagram schematically showing an environment to which a referer verification apparatus for controlling web traffic having malicious code is applied according to an embodiment of the present invention.

The present invention will be described in detail below with reference to the accompanying drawings. In the following description, redundant descriptions and detailed descriptions of known functions and elements that may unnecessarily make the gist of the present invention obscure will be omitted. Embodiments of the present invention are provided to fully describe the present invention to those having ordinary knowledge in the art to which the present invention pertains. Accordingly, in the drawings, the shapes and sizes of elements may be exaggerated for the sake of clearer description.

Hereinafter, a referer verification apparatus and method for controlling web traffic having malicious code according to an embodiment of the present invention will be described in detail with reference to the attached drawings.

Figure 2:
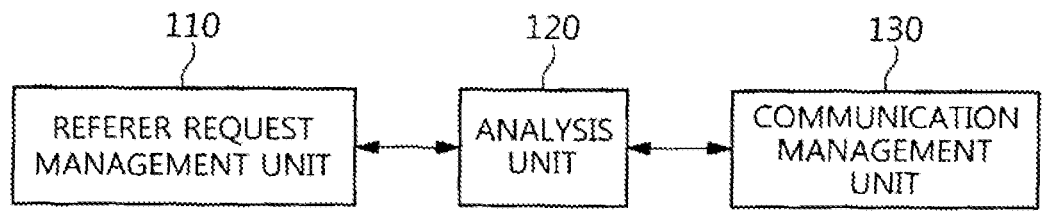
FIG. 2 is a configuration diagram showing a server according to an embodiment of the present invention.
Figure 3:
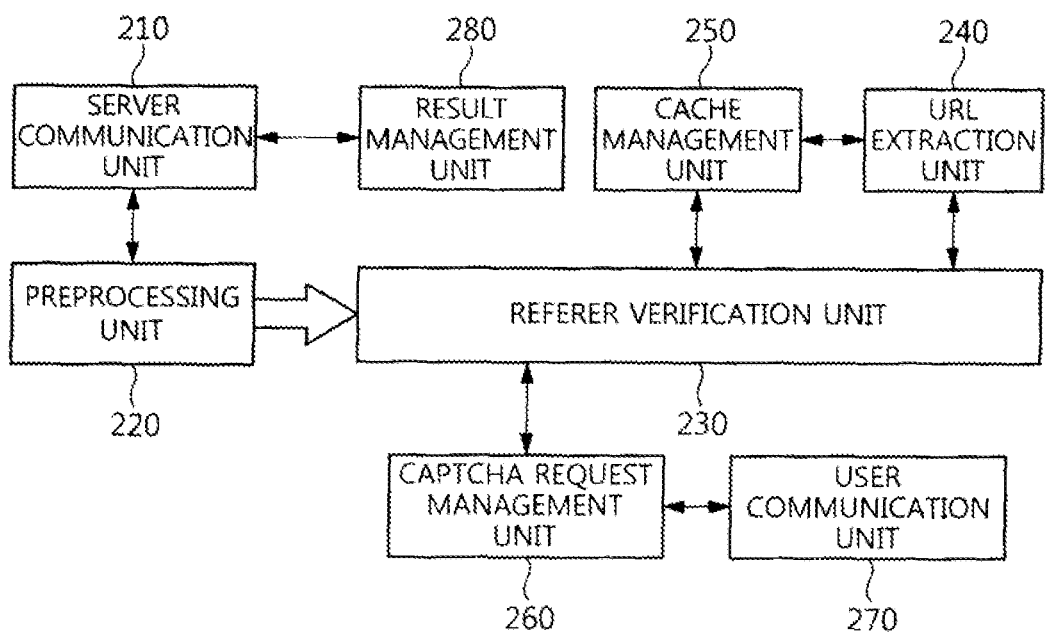
FIG. 3 is a configuration diagram showing a referer verification apparatus according to an embodiment of the present invention.

FIG. 1 is a configuration diagram schematically showing an environment to which a referer verification apparatus for controlling web traffic having malicious code is applied according to an embodiment of the present invention. FIG. 2 is a configuration diagram showing a server according to an embodiment of the present invention, and FIG. 3 is a configuration diagram showing a referer verification apparatus according to an embodiment of the present invention.

Referring to FIG. 1, a referer verification environment for controlling web traffic, having malicious code according to an embodiment of the present invention includes a server 100 and a referer verification apparatus 200.

The server 100 transfers a Hypertext Transfer Protocol (HTTP) packet corresponding to a target, the referer of which is to be verified, to the referer verification apparatus 200, receives the results of the verification of a referer corresponding to the HTTP packet, and then determines whether to block communication.

Referring to FIG. 2, the server 100 includes a referee request management unit 110, an analysis unit 120, and a communication management unit 130.

The referer request management unit 110 transfers an HTTP packet desired to be verified to the referer verification apparatus 200, and receives the results of the verification of the referer corresponding to the HTTP packet.

The analysis unit 120 determines whether to block the flow of communication, that is, traffic, based on the results of the referer verification and a management list.

The communication management unit 130 manages the flow of communication depending on the results of the determination by the analysis unit 120, and manages a list related to the flow of communication.

The referer verification apparatus 200 performs a referer verification procedure for an HTTP packet desired to be verified by the server 100 and a Completely Automated Public Test to tell Computers and Humans Apart (CAPTCHA) verification procedure and takes charge of the management of a cache.

Referring to FIG. 3, the referee verification apparatus 200 includes a server communication unit 210, a preprocessing unit 220, a referer verification unit 230, a Uniform Resource Locator (URL) extraction unit 240, a cache management unit 250, a CAPTCHA request management unit 260, a user communication unit 270, and a result management unit 280.

The server communication unit 210 receives a referer verification request from the server 100, and transfers the results of the verification corresponding to the referer verification request to the server 100.

The preprocessing unit 220 performs a preprocessing procedure before the referer verification unit 230 verifies the referer information. Here, the preprocessing procedure is configured to parse an HTTP packet received along with the referer verification request, determine based on the results of the parsing whether a cache is present, and then determines whether to verify the referer depending on whether a cache is present. Here, the preprocessing unit 220 allows the referer verification unit 230 to perform the referer verification procedure if it is determined that a cache is not present.

The referer verification unit 230 performs the referer verification procedure of verifying referer information.

In detail, the referer verification unit 230 performs the procedure of verifying whether a referer is present in the HTTP packet, the procedure of verifying the validity of a URL corresponding to the referer verification request and that of the referer, etc.

The URL extraction unit 240 extracts dynamic and static URLs from a referer web page corresponding to the referer verification request processed by the refer verification unit 230.

In detail, the URL extraction unit 240 identifies URLs, which are statically described in the referer web page, and extracts the results of the identification, that is, static URLs. Further, the URL extraction unit 240 identifies URLs generated by pieces of code having various formats executed on the referer web page, and extracts the results of the identification, that is, dynamic URLs.

Further, the cache management unit 250 adds the URLs extracted by the URL extraction unit 240 to a referer cache.

The CAPTCHA request management unit 260 performs secondary verification conducted by the user, that is, a CAPTCHA verification procedure. Hew the term "CAPTCHA verification procedure" denotes the procedure of verifying malicious code traffic using the cognitive response of the user.

The user communication unit 270 performs communication with the communication module of the user so that the secondary verification can be conducted by the user in the CAPTCHA request management unit 260.

The result management unit 280 may manage the results of the referer verification procedure performed by the referer verification unit 230, that is, verification results, and transfer the verification results to the server 100 via the server communication unit 210.

Next, a referer verification method for controlling web traffic having malicious code will be described in detail below with reference to FIG. 4.

Figure 4:
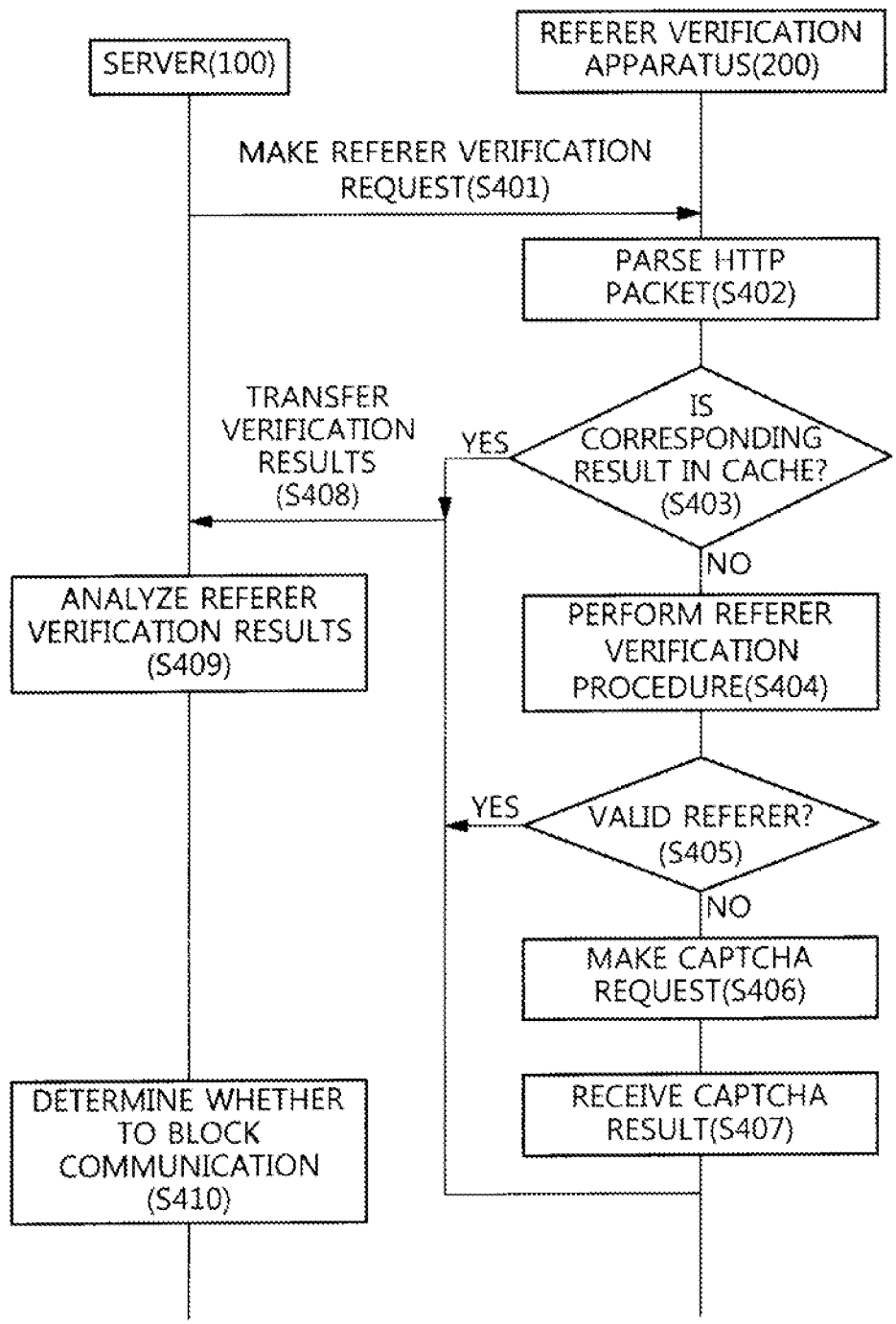
FIG. 4 is a flowchart showing a verification procedure performed between the referer verification apparatus for controlling web traffic having malicious code and the server according to an embodiment of the present invention.

FIG. 4 is a flowchart showing a verification procedure performed between the referer verification apparatus for controlling web traffic having malicious code and the server according to an embodiment of the present invention.

Referring to FIG. 4, the server 100 makes a referer verification request to the referer verification apparatus 200 at step S401. In this case, the server 100 transfers an HTTP packet desired to be verified along with the request.

The referer verification apparatus 200 parses the HTTP packet received along with the referer verification request at step S402.

The referer verification apparatus 200 determines whether the corresponding result is in the cache based on the results of the parsing of the HTTP packet at step S403.

The referer verification apparatus 200 performs a referer verification procedure at step S404 if the corresponding result is not in the cache. Here, the referer verification procedure includes the procedure of verifying whether a referer is present in the HTTP packet, the procedure of verifying the validity of a URL corresponding to the referer verification request and that of the referer, etc.

The referer verification apparatus 200 determines based on the results of the referer verification at step S404 whether a valid referer is present at step S405.

If it is determined that a valid referer is not present, the referer verification apparatus 200 requests the communication module of the user to perform a CAPTCHA verification procedure on the basis of the results of the referer verification at step S406, and receives the results of the CAPTCHA verification, corresponding to the results of the request at step S406, at step S407.

The referer verification apparatus 200 transfers the results of the verification corresponding to the referer verification request, that is, cache information obtained when the cache is present at step S403, the results of the referer verification procedure obtained when the referer is present at step S405, that is, the results of the referer verification, and the results of the CAPTCHA verification received at step S407, to the server 100 at step S408.

The server 100 analyzes the results of the verification corresponding to the referer verification request at step S409, and determines based on the results of the analysis whether to block communication at step S410.

Next, a referer verification procedure performed by the referer verification unit and the URL extraction unit of the referer verification apparatus will be described in detail below with reference to FIG. 5.

Figure 5:
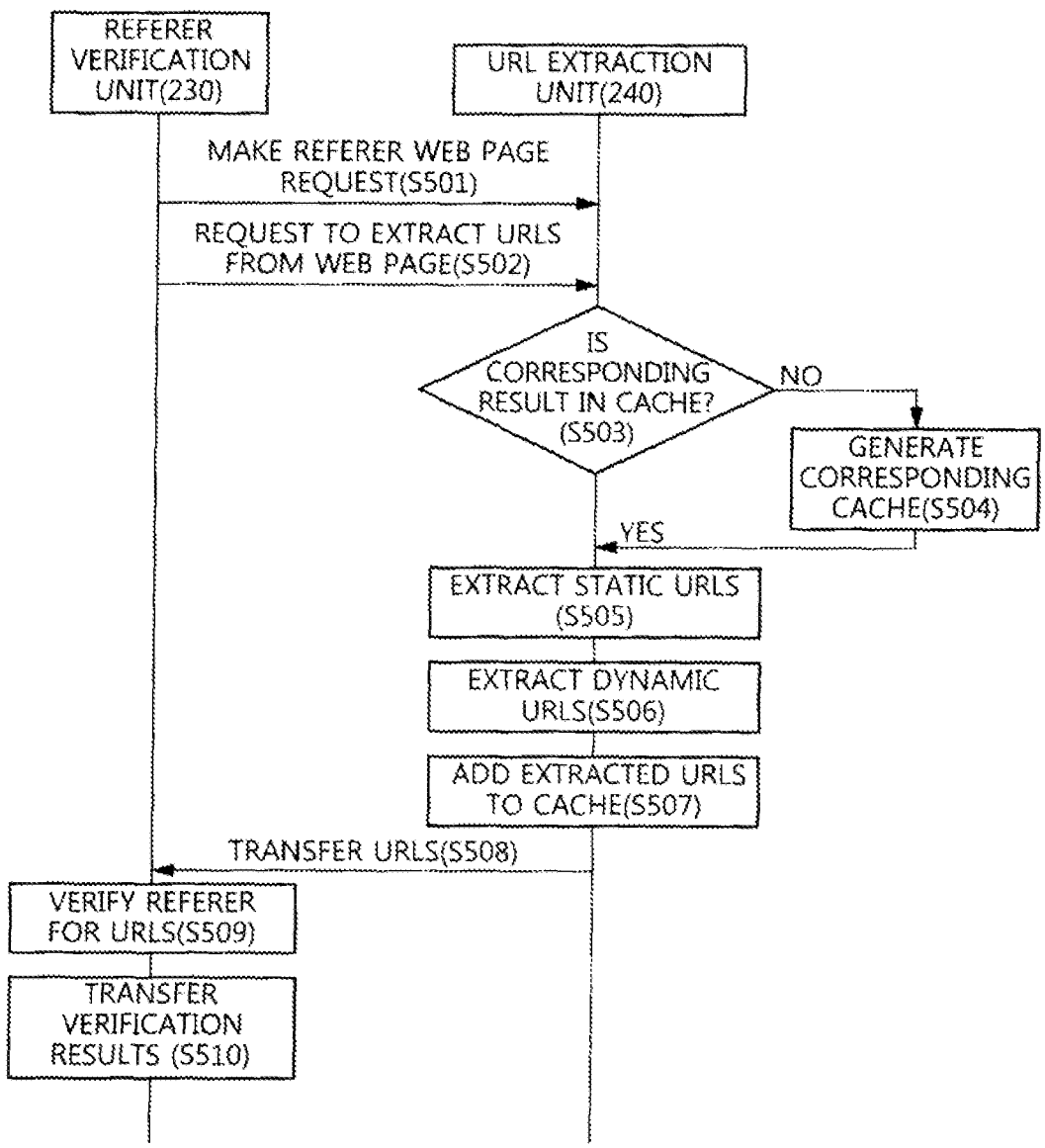
FIG. 5 is a flowchart showing a referer verification procedure performed by the referer verification unit and the URL extraction unit of the referer verification apparatus according to an embodiment of the present invention.

FIG. 5 is a flowchart showing a referer verification procedure performed by the referer verification unit and the URL extraction unit of the referer verification apparatus according to an embodiment of the present invention.

Referring to FIG. 5, the referer verification unit 230 makes a referer web page request at step S501 and also makes a URL extraction request, corresponding to the referer web page request made at step S501, at step S502 in order to obtain dynamic and static URLs from a referer web page before a referer verification procedure is performed.

The URL extraction unit 240 checks the results of the determination made by the preprocessing unit 220 as to whether the corresponding result is in the cache at step S503.

The URL extraction unit 240 generates a corresponding cache if it is determined at step S503 that the corresponding result is not in the cache at step S504.

The URL extraction unit 240 identifies URLs statically described in the referer web page, based on the cache and extracts the results of the identification, that is, static URLs, at step S505.

Next, the URL extraction unit 240 identifies URLs generated by pieces of code having various formats executed on the referer web page, based on the cache, and extracts the results of the identification, that is, dynamic URLs, at step S506.

The URL extraction unit 240 adds the URLs extracted at steps S505 and S506 to the referer cache at step S507.

The URL extraction unit 240 transfers the URLs extracted at steps S505 and S506 to the referer verification unit 230 at step S508.

The referer verification unit 230 performs a referer verification procedure based on whether the URL requested at step S502 is present in the URLs received from the URL extraction unit 240, that is, a set of URLs present in the referer web page (including static and dynamic URLs) at step S509.

The referer verification unit 230 transmits the results of the referer verification procedure performed at step S509, that is, referer verification results, to outside the referer verification apparatus at step S510.

As described above, the present invention provides a method that performs two verification procedures, that is, a referer verification procedure for HTTP traffic and a CAPTCHA authentication (verification) procedure, at a network web traffic induction time point at which malicious code starts behaving maliciously, and thereafter blocks or permits traffic suspected of being malicious behavior, depending on the results of the procedures.

The present invention can more rapidly perform verification because an additional operation such as signature input is not required and an overhead additionally required to perform verification is reduced by an anticipative caching procedure.

According to the embodiments of the present invention, a referer verification apparatus and method can effectively identify and block malicious code traffic by means of a referer verification procedure for HTTP traffic and a CAPTCHA verification procedure, without requiring procedures, such as protocol analysis and the input of an additional detection signature that result in a large overhead.

As described above, optimal embodiments of the present invention have been disclosed in the drawings and the specification. Although specific terms have been used in the present specification, these are merely intended to describe the present invention and are not intended to limit the meanings thereof or the scope of the present invention described in the accompanying claims. Therefore, those skilled in the art will appreciate that various modifications and other equivalent embodiments are possible from the embodiments. Therefore, the technical scope of the present invention should be defined by the technical spirit of the claims.

What is claimed is:

1. A referer verification method comprising:

determining whether a referer is present in a Hypertext Transfer Protocol (HTTP) packet;

if it is determined that the referer is present in the HTTP packet, making a request for a referer web page corresponding to the referer and making a request for extraction of a Uniform Resource Locator (URL) corresponding to the referer web page according to a referer verification request received from a server;

extracting Uniform Resource Locators (URLs) from the referer web page corresponding to the referer;

parsing the HTTP packet;

searching a cache using the HTTP packet;

verifying the referer based on a comparison of the URL corresponding to the referer web page and the URLs extracted from the referer web page; and performing a Completely Automated Public Test to tell Computers and Humans Apart (CAPTCHA) verification procedure based on results of the verification of the referer.

2. The referer verification method of claim 1, wherein the extracting the URLs comprises identifying URLs statically described in the referer web page and then extracting static URLs.

3. The referer verification method of claim 1, wherein the extracting the URLs comprises identifying URLs generated by a plurality of pieces of code executed on the referer web page and then extracting dynamic URLs.

4. The referer verification method of claim 1, wherein the performing the CAPTCHA verification procedure corresponds to a procedure of verifying malicious code traffic using a cognitive response of the user.

5. A referer verification apparatus comprising:
- a server communication unit for receiving a referer verification request from a server and transferring results of the verification corresponding to the received request to the server;
- a Uniform Resource Locator (URL) extraction unit for, if a referer is present in a Hypertext Transfer Protocol (HTTP) packet corresponding to the referer verification request, extracting URLs from a referer web page corresponding to the referer;
- a preprocessing unit for parsing the HTTP packet and searching a cache;
- a referer verification unit for verifying the referer based on comparison of a URL corresponding to the referer verification request and the URLs extracted from the referer web page; and
- a Completely Automated Public Test to tell Computers and Humans Apart (CAPTCHA) request management unit for performing a CAPTCHA verification procedure based on results of the verification of the referer.

6. The referer verification apparatus of claim 5, wherein the URL extraction unit identifies URLs statically described in the referer web page and then extracts static URLs.

7. The referer verification apparatus of claim 5, wherein the URL extraction unit identifies URLs generated by a plurality of pieces of code executed on the referer web page and then extracts dynamic URLs.

8. The referer verification apparatus of claim 5, wherein the CAPTCHA verification procedure corresponds to a procedure of verifying malicious code traffic using a cognitive response of the user.

* * * * *